March 18, 1924.
D. M. WATTERS
CULTIVATOR
Filed June 9, 1919     3 Sheets-Sheet 3
1,487,412
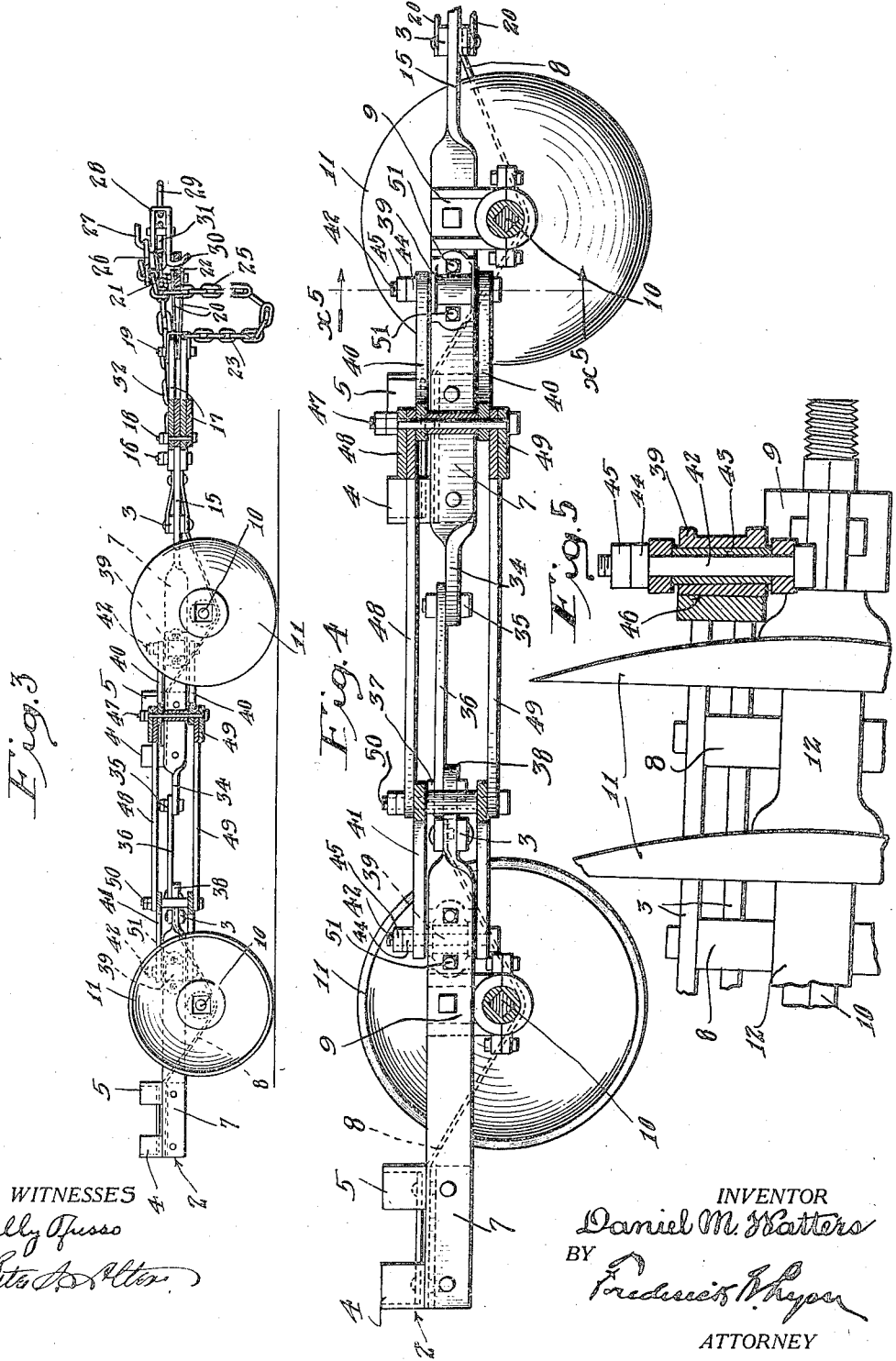
WITNESSES
INVENTOR
Daniel M. Watters
BY
ATTORNEY Patented Mar. 18, 1924.

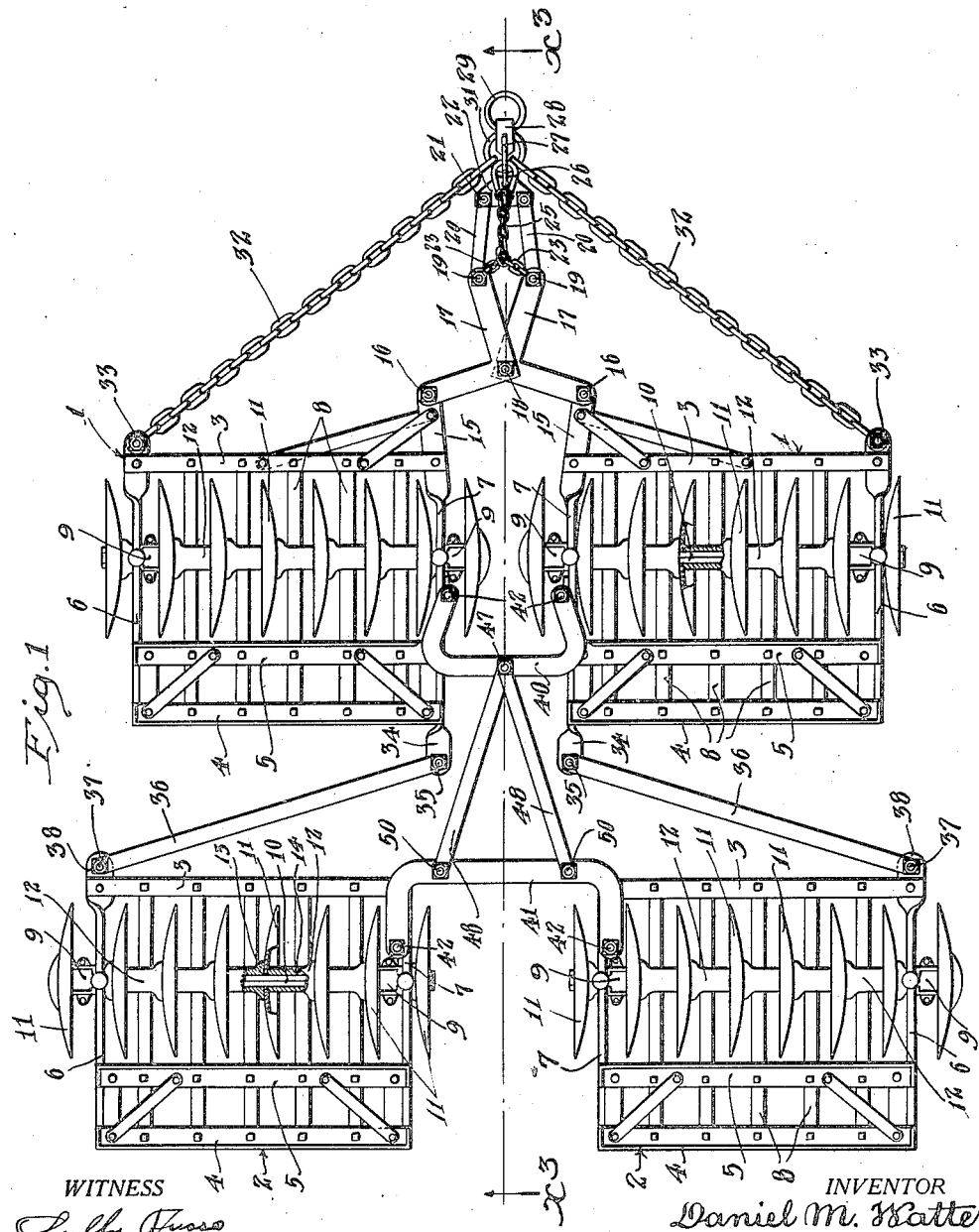

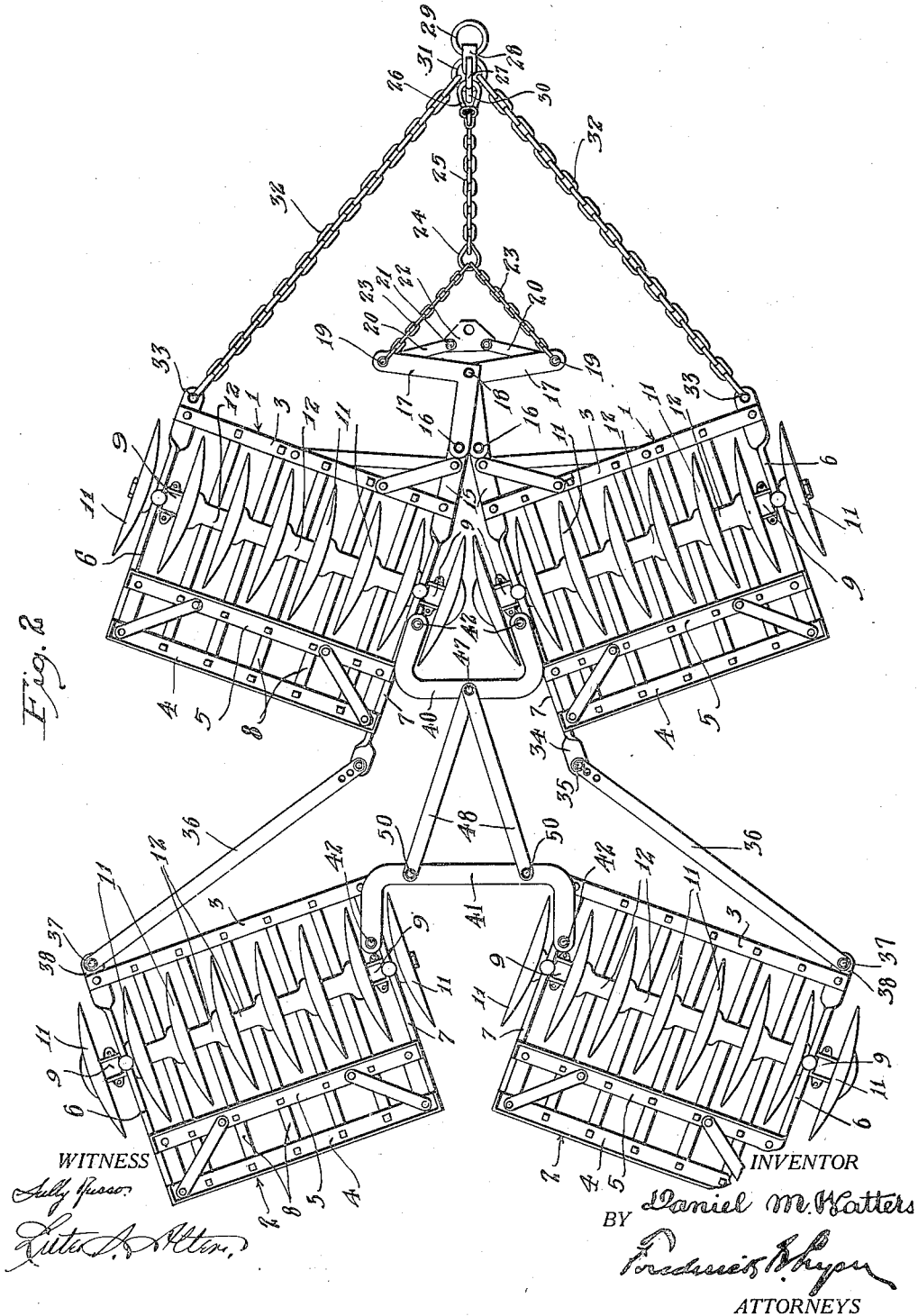

1,487,412

UNITED STATES PATENT OFFICE.

DANIEL M. WATTERS, OF LOS ANGELES, CALIFORNIA, ASSIGNOR TO KILLEFER MANUFACTURING COMPANY, OF LOS ANGELES, CALIFORNIA, A CORPORATION OF CALIFORNIA.

CULTIVATOR.

Application filed June 9, 1919. Serial No. 302,639.

*To all whom it may concern:*

Be it known that I, DANIEL M. WATTERS, citizen of the United States, residing at Los Angeles, in the county of Los Angeles and State of California, have invented a new and useful Cultivator, of which the following is a specification.

This invention relates to cultivators and more especially to that type of cultivator having the cultivator frames arranged in paired gangs and provided with means for changing the angular relation of the frames so that the disks or other cultivator members carried by the frames may be presented parallel or at different angles to the direction of travel of the cultivator. This invention is an improvement on the cultivator for which an application for patent was filed by myself and Charles E. Bean, October 16, 1918, Serial No. 258,480.

The frames of this present cultivator are adapted to be shifted into different angular relations by the pull of the tractor or other draft power and in that respect is analogous to the prior invention referred to above.

In cultivators of this type, there is a tendency for the cultivator members nearer the outer ends of the front gangs to penetrate the ground to greater depth than the more central cultivators of the front gangs; and there is a tendency for the more central cultivator members of the rear gangs to penetrate the ground to greater depths than the cultivator members nearer the outer ends of said rear gangs.

One of the principal objects of this invention is to so construct the cultivator that all of the cultivator members will penetrate the ground uniformly so that the ground will be cultivated to a given depth by each cultivator member and there will be no tendency to buckling up or "bridging" of the front gang or buckling down or sagging of the rear gang.

Another object is to provide a construction of great durability.

Another object is to provide a construction of comparative great simplicity, taking into consideration the advantageous results effected.

Other objects and advantages will appear in the subjoined detailed description.

The accompanying drawings illustrate the invention:

Figure 1 is a plan view of a cultivator built in accordance with the provisions of this invention, the frames of each gang being in alinement with one another for operating over the ground without cultivating it.

Fig. 2 is a plan view of the cultivator with the parts in position for cultivating the ground.

Fig. 3 is a longitudinal section taken on the line indicated by $x^3$—$x^3$, Fig. 1.

Fig. 4 is an enlarged elevation analogous to Fig. 3 excepting that the innermost disks are omitted and the front portion of the draft device is broken away to contract the view.

Fig. 5 is an enlarged detail partly in section on line indicated by $x^5$—$x^5$, Fig. 4.

There are provided front cultivator frames 1 arranged in a pair to form in part gangs, and rear cultivator frames 2 arranged in a pair to form in part gangs. Each frame comprises transversely extending front, rear and intermediate bars 3, 4, 5 respectively; outer end bars 6 fastened to the outer ends of the bars 3, 4 and 5; inner end bars 7 fastened to the inner ends of the bars 3, 4 and 5; and a plurality of longitudinally extending scraper bars 8 fastened at their ends to the bars 3, 4 and also fastened intermediate of their ends to the bar 5. The scraper bars 8 are bowed downwardly intermediate of their ends. On the bars 4, 5 and rear ends of the bars 8 may be placed rock or other suitable ballast to increase the weight so as to increase the depth of cut of the cultivator.

Bolted to the end bars 6, 7 of each frame are bearings 9. The bearings of each frame support an axle 10. Each axle is provided with a series of cultivator members which, in this instance, are in the form of disks 11, and which are spaced from one another by sleeves or spools 12. The axles 10 are square in cross section and the disks 11 and sleeves 12 are provided with square holes 13, 14 respectively adapted to fit the square portions of the axles. Thus the disks 11 cannot turn relative to the axle on which they are mounted. The spools 12 at the ends of the axles 10 are journaled in the bearings 9.

The bars 7 of the front frames are provided at their forward ends with ears 15 which are pivoted at 16 to the rear ends of bell-crank levers 17, respectively, that are pivoted to each other at 18. The forward ends of the levers 17 are pivoted at 19 to the rear ends of links 20 which in turn are pivoted at their forward ends at 21 to an eye 22 that may be in the form of a perforated plate. Also connected to the forward ends of the levers 17 by the pivots 19 are flexible draft members 23 which are connected together at their forward ends by an eye 24 that in turn is connected by a flexible draft member 25 to an eye or grab link 26. The eye 26 is adapted to engage a hook 27 projecting from an eye 28 which is adapted to be connected by a ring 29, or its equivalent, to suitable draft power such, for example, as a tractor. The eye 28 is also provided with another hook 30 adapted to detachably engage the eye 22 as in Figs. 1 and 3. In Fig. 2 the eye 22 is shown disengaged from the hook 30. The eye 28 engages a ring 31 to which is attached the forward ends of a pair of flexible draft members 32 that are fastened at their rear ends respectively to ears 33 on the forward ends of the end bars 6 of the front frames. The draft members 23, 25 are of such lengths that when the eye 22 is disengaged from the hook 30 the outer ends of the front frames 3 will be swung forwardly and inwardly by the draft members 32, as in Fig. 2, when power is applied to produce a pull on the ring 29. Also when the eye 22 is engaged with the hook 30 the frames of each gang are alined with each other.

The rear ends of the bars 7 of the front frames are provided with ears 34 which are pivoted at 35 to draft members 36. In this particular instance the draft members 36 are rigid and are in the form of rods, but said members may be flexible if desired. The members 36 are pivoted at their rear ends at 37 to ears 38 on the forward ends of the end bars 6 of the rear frames 2.

The inner bearings 9 of the front frames are bolted to the inner faces of the end bars 7, and the inner bearings of the rear frames 2 are bolted to the outer faces of the bars 7. Bolted to the outer faces of the front bars 7 and to the inner faces of the rear bars 7 are bearings 39 shown in detail in Fig. 5. The front bearings 39 are connected together by a yoke 40 and the rear bearings 39 are connected together by a yoke 41. The connection between the yokes 40, 41 and the associated bearings is a pivotal one, the pivots being indicated at 42. Each pivot 42 passes through a bushing 43 which is slightly longer than the bearing 39 as clearly shown in Fig. 5. In this instance each of the yokes 40, 41 is formed by an upper and a lower member which are separated from one another at their ends by a bushing 43. The pivots 42 in this particular instance are in the form of bolts each bolt being provided with nuts 44, 45.

The attaching face 46 of each bearing 39 is not parallel with the axis of the pivot 42 but is formed aslant to said axis as clearly shown in Fig. 5. The face 46 of each front bearing 39 is aslant downwardly and outwardly relative to the axis of the associated pivot 42 so that when the pivots 42 are vertical the inner ends of the front frames will be depressed slightly below the level of the outer ends of said frames. The face 46 of each rear bearing 39 is aslant upwardly and outwardly relative to the axis of the pivots 42 so that when the pivots 42 are vertical the inner ends of the rear frames will be at a higher level than the outer ends of said rear frames. The reason for providing the slanting faces 46 will appear hereinafter.

The yoke 40 is pivoted at 47 at its middle portion to a rigid connecting member which may be V-shaped and which, in this particular instance, comprises a pair of rearwardly diverging upper members 48 and a pair of rearwardly diverging lower members 49. The rear ends of the members 48, 49 are bolted or otherwise secured at 50 to the upper and lower members of the yoke 41. Thus an equal pull on the rods 36 will cause the rear gangs to travel straight ahead and a pull on only one of said rods will cause the rear gangs to turn about the pivot 47.

The invention operates as follows: Assuming, for example, that a tractor or other suitable draft power is hitched to the ring 29 and is operating to pull the cultivator along, and assuming that the eye 22 is engaged with the hook 30 as in Figures 1 and 3, the pull is applied to the inner ends of the front frames through the eye 28, hook 30, draft connections 25, 23 and levers 17 and the pull is applied to the outer ends of the front frames through the ring 31 and draft members 32. The pull of the front frames is transmitted through the draft members 36 to the outer ends of the rear frames, and the pull is also transmitted from the front frames through the yoke 40, connection 48 and yoke 41 to the inner ends of the rear frames. When it is desired to cause the frames of each gang to assume an angular relation to each other, the draft power will be stopped and the eye 22 will be disengaged from the hook 30. This will make the inner draft means including the members 17, relatively longer with respect to the outer draft members 32. Then the draft power will be driven ahead thus exerting a pull on the draft members 32 to swing forwardly and inwardly the outer ends of the front frames. This movement swings the inner front corners of the front frames toward one another and this in turn spreads the forward ends of the levers 17 away from one another. At the same time the rear inner corners of the frames are swung away from one another. As the outer ends of the front frames swing forwardly the distance between the hook 27 and levers 17 increases until the draft connections 23, 25 are drawn taut, whereupon pull is exerted through the hook 27, draft connections 25, 23 and levers 17 to the inner front corners of the front frames. The front gang now advances and the pull of the inner ends of the front frames is transmitted through the yoke 40, connections 48, 49 and yoke 41 to the inner ends of the rear frame, thus drawing forward said inner ends.

After the foregoing described movements the parts are in the positions shown in Fig. 2 and the cultivator members 11 cut into the soil to plow or cultivate it in a manner well understood in the art relating to cultivators of this character. When the frames are in the cultivating position shown in Fig. 2 there is a tendency for the inner ends of the front frames to be raised to a higher level than the outer ends of said frames thus causing bridging of the front gangs and consequently permitting the cultivator members nearer the outer ends of the front frames to cut deeper into the soil than the cultivator members nearer the inner ends of the front frames. As clearly described above the construction is such that, when the cultivator is stationary on a level surface, the inner ends of the front frames are normally depressed below the level of the outer ends of the front frames and this depression is sufficient so that when the inner ends of the front frames are caused to rise to a greater degree than the outer ends of the front frames the difference in the amount of rise is compensated for by the degree of slant of the attaching faces 46 of the front bearings 39. In consequence of this the front frames when the cultivating operation is being performed are substantially on a level so that the cultivator members cut or plow equal depths into the soil.

There is also a tendency for the outer ends of the rear frames to be raised higher than the inner ends of said rear frames during the cultivating operation and this tendency is counteracted by reason of the slant of the attaching faces 46 of the rear bearings 39, the inner ends being at a higher level than the outer ends of the rear frames when the cultivator is at rest on a level surface. When, however, the cultivator is operating, the tendency of the cultivator members nearer the inner ends of the frames to cut deeper into the soil than the cultivator members nearer the outer ends of the rear frames is overcome and nullified by reason of the slant of the attaching faces 46, so that when cultivating or plowing the cultivator frames are substantially level from end to end and the cultivator members all cut into the soil to the same depth as one another. When the pivots 42 become worn or, if for any other reason it becomes desirable to change the degree of angle between the end bars 7 and the axes of the pivots 42, the bolts 51 of the bearings 39 will be loosened and shims, not shown, will be inserted between the attaching faces 46 and the bars 7 so as to increase or diminish the amount of tilt of the pivots 42 relative to the bars 7.

When it is desired to turn the cultivator to one side or the other the draft power will be steered in either direction, thus causing a greater amount of pull on one of the draft connections 32 than on the other so as to swing the front gangs and rear gangs relatively about the pivot 47. In making the turn the frames at one end of the cultivator approach one another and the frames at the other end of the cultivator move away from one another, but the relative angularity of the frames of the front gangs are not altered nor is the relative angularity of the frames of the rear gangs altered to any substantial degree.

When it is desired to return the parts to their uncultivating position, the draft power will be reversed, thus slackening the draft connections 32, and the eye 22 will be engaged with the hook 30. Then the draft power will be driven forwardly thus pulling the inner ends of the front frames forwardly. This swings the inner rear corners of the front frames toward each other and therefore the draft connections 36 transmit the pull to the outer ends of the rear frames to draw said outer ends forwardly. When the ring 31 has been drawn forwardly sufficiently to make the draft connections 32 taut the front frames will be in endwise alinement as will also the rear frames.

I claim:

1. A cultivator comprising a front pair of frames, a rear pair of frames, cultivator members carried by each of the frames, a yoke pivoted at its ends to the inner ends of the front frames respectively, a second yoke pivoted at its ends to the inner ends of the rear frames respectively, means pivotally connecting the yokes to each other, means to change the relative positions of the front frames, and means operative by change of relative positions of the front frames to move the outer ends of the rear frames.

2. A cultivator comprising a front pair of frames, a rear pair of frames, cultivator members carried by each of the frames, a yoke pivoted at its ends to the inner ends of the front frames respectively, a second yoke pivoted at its ends to the inner ends of the rear frames respectively, means pivotally connecting the yokes to each other, a draft device, and means operative by pulling of the draft device to shift the outer ends of the frames of the front pair and the outer ends of the frames of the rear pair relatively in opposite directions.

3. A cultivator comprising a front pair of frames, a rear pair of frames, cultivator members carried by each of the frames, means to permanently hold the inner ends of each pair of frames in definite spaced relation to each other, means to change the relative positions of the front frames, and means operative by change of relative positions of the front frames to move the outer ends of the rear frames.

4. A cultivator comprising a front pair of frames, a rear pair of frames, cultivator members carried by each of the frames, means to hold the inner ends of the front frames and inner ends of the rear frames against relative bodily movement, a draft device, and means operative by pulling of the draft device to shift the outer ends of the frames of the front pair and the outer ends of the frames of the rear pair relatively in opposite directions.

5. A cultivator comprising a front pair of frames, a rear pair of frames, cultivator members carried by each of the frames, draft means connected with the front frames for pulling them over the ground, said means including a device for effecting a change in the relative positions of the front frames by power applied to the draft means, a yoke pivoted at its ends to the rear frames, means connecting the yoke to the front frames, and draft connections extending from the rear inner corners of the front frames to the front outer corners of the rear frames.

6. A cultivator comprising a front pair of frames, a rear pair of frames, cultivator members carried by each of the frames, said rear frames having front bars respectively extending along in front of the cultivator members carried by the rear frames, means to change the relative positions of the front frames, a yoke pivoted at its ends to the rear frames, means connecting the yoke to the front frames, and draft connections extending from the rear inner corners of the front frames and attached to the said front bars adjacent to the front outer corners of the rear frames.

7. A cultivator comprising a front pair of frames, a rear pair of frames, cultivator members carried by each of the frames, means to change the relative positions of the front frames, a yoke pivoted at its ends to the inner ends of the front frames, a second yoke pivoted at its ends to the inner ends of the rear frames, means pivotally connecting the yokes to each other, and draft connections extending from the rear inner corners of the front frames to the front outer corners of the rear frames.

8. A cultivator comprising a front pair of frames, a rear pair of frames, cultivator members carried by each of the frames, means to change the relative positions of the front frames, a yoke pivoted at its ends to the front frames, means connecting the yoke to the rear frames, and draft connections extending from the rear inner corners of the front frames to the front outer corners of the rear frames.

9. A cultivator comprising a front pair of frames, a rear pair of frames, cultivator members carried by each of the frames, means to change the relative positions of the front frames, a yoke pivoted at its ends to the inner ends of the front frames, a second yoke pivoted at its ends to the inner ends of the rear frames, a V-shaped connection projecting from one of the yokes and pivoted to the other yoke, and means operative by change of relative positions of the front frames to move the outer ends of the rear frames.

10. A cultivator having a pair of gang frames, cultivator members thereon, means connecting said frames, bearings supported from the frames, and pivotal connections between said connecting means and bearings, said bearings being tilted so that the frames swing on the pivots in planes angularly disposed to a horizontal transverse plane of the cultivator.

11. A cultivator comprising a front pair of frames, a rear pair of frames, cultivator members carried by each of the frames, a yoke pivoted at its ends to the inner ends of the front frames, a second yoke pivoted at its ends to the inner ends of the rear frames, and means pivotally connecting the yokes to each other.

12. A cultivator comprising a front pair of frames, a rear pair of frames, cultivator members carried by each of the frames, a yoke pivoted at its ends to the inner ends of the front frames, a second yoke pivoted at its ends to the inner ends of the rear frames, a rigid member extending from one of the yokes and pivoted to the other yoke, and rigid draft connections pivoted at one end to the inner rear corners of the front frames and pivoted at their other ends to the outer front corners of the rear frames.

13. A cultivator comprising a pair of frames, cultivator members carried by the frames, means to draw the frames with the cultivator members aslant to the longitudinal axis of the cultivator, the slant of the cultivator members of one frame being opposed to the slant of the cultivator members of the other frame, bearings at the inner ends of the frames, a yoke, and pivots at the opposite ends of the yoke carried by the bearings respectively, the axes of the bearings being aslant relative to the axes of the pivots, whereby the gangs are held in planes inclined to a horizontal plane, and the yoke engaging the pivots above and below the bearings.

14. A cultivator comprising a pair of frames, shafts carried by the frames, disks mounted on the shafts, means to draw the frames with the disks aslant to the longitudinal axis of the cultivator, the slant of the disks of one frame being opposed to the slant of the disks of the other frame, bearings at the inner ends of the frames, a yoke, and pivots at the opposite ends of the yoke carried by the bearings respectively, the axes of the bearings being aslant relative to the axes of the pivots and the yoke engaging the pivots above and below the bearings.

15. A cultivator having a forward pair of cultivator frames, a draft hook, outer draft members connecting the same to the outer ends of the frames, inner draft means connecting the hook to the inner ends of the forward frames, a pair of rear cultivator frames, capable of holding the forward frames disposed in alignment with each other, said draft means constructed to enable the inner draft members to be made relatively longer, with respect to the outer draft members to throw the forward frames into an anguler relation, links connecting the inner ends and rear sides of the forward frames with the forward sides and outer ends of the rear frames, and means respectively connecting the inner ends of the forward frames and the inner ends of the rear frames, and acting to hold the frames of each pair permanently in definite spaced relation to each other while permitting pivotal movement of said frames.

Signed at Los Angeles, California this 24th day of May 1919.

DANIEL M. WATTERS.

Witnesses:
GEORGE H. HILES,
L. BELLE WEAVER.